United States Patent Office 3,230,021
Patented Jan. 18, 1966

3,230,021
MEANS FOR EFFECTING CONTROLLED DISPEN-
SATION OF LIQUID METAL LUBRICANTS
Samuel V. Nablo, Stoneham, and William J. Courtney,
Natick, Mass., assignors to Ion Physics Corporation,
Burlington, Mass., a corporation of Delaware
Filed Dec. 9, 1963, Ser. No. 328,920
1 Claim. (Cl. 308—121)

The devices herein disclosed are advantageously utilized to reduce friction under environmnetal conditions which render conventional lubricating techniques ineffective. One principal function of the apparatus comprehended by this invention therefore is to establish and maintain a liquid metal film between movable contacting elements in a vacuum. The principles of the invention may be applied to members in sliding contact, rotating journal bearings, ball and roller bearings, rotating vacuum seals and to other applications, both in and out of a vacuum environment, which require a continuing controlled delivery of liquid metal.

Heretofore, the reduction of friction between movable contacting members in a vacuum seldom has been satisfactorily achieved. A principal problem encountered is that the use of conventional lubricants and lubricating techniques introduces an unwanted source of vacuum contaminants into the system. Technological advances in all areas involving vacuum environments are reflected by concomitant demands for better lubrication between moving parts in harder vacuums. For instance, devices which employ a vacuum to insulate high voltages are particularly vulnerable to organic contaminants which might initiate electrical breakdown and thus require something more effective than prior lubricating techniques. Space systems also represent an area of interest in which lubrication requirements are extremely severe. Such requirements define lubricating devices which must resist high radiation fluxes; permit high speed journal operation without excessive wear or vacuum contamination; provide lubrication dispensation without pressure system or gravitational field dependence; withstand wide temperature variations; and exhibit minimum loss of lubricant through evaporation.

Accordingly, it is a principal object of this invention to provide a novel lubricating device adapted to meet all of the foregoing requirements.

It is another, more specific object of this invention to provide a porous metal bearing for vacuum applications having the capability of storing metal lubricant and delivering said lubricant to the journal-bearing interface.

These, together with other objects and features of the invention will become more readily apparent from the following detailed description taken in conjunction with the accompanying drawings wherein.

Figure 1:
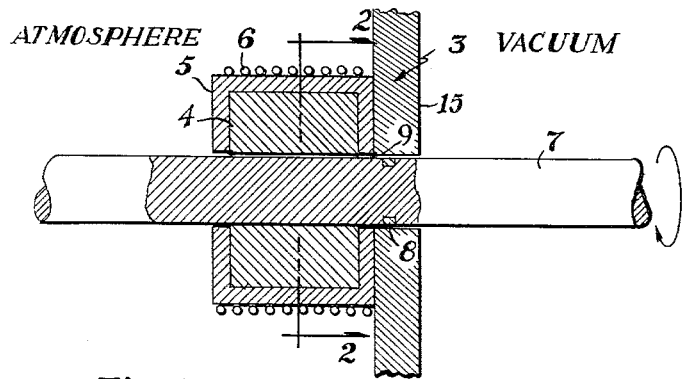
FIGURE 1 illustrates, in partial section, a bearing and journal fabricated in accordance with the principles of the invention.
Figure 2:
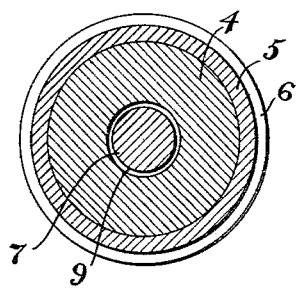
FIGURE 2 is a sectional view of FIGURE 1 taken at 2—2.

Referring now to FIGURES 1 and 2, the bearing 3 therein illustrated comprises reservoir number 4, cap member 5 and heater coil 6.

Reservoir member 4 is fabricated, through powder metallurgical techniques, as a porous slug with a high percentage of interconnected pores. This porous slug is infiltrated with a metal lubricant and machined to its final dimensions. After mating the bearing with journal 7 a fresh metal film surface can be readily formed between journal 7 and the bearing by heating the assembly to a few degrees above the melting point of the lubricant with peripheral heater coil 6. The melted liquid expands supplying a metal film lubricant at the bearing/journal surface. A band of nonwettable material 8 is provided on the journal as shown to prevent loss of liquid metal lubricant along the shaft. Although peripheral heating of the bearing is illustrated by way of example, in principle, a lubricating metal or alloy can be designed to operate satisfactorily in a specified environment without auxiliary heating. Any design temperature between the melting point of Wood's Metal and the recrystallization temperature of the porous substrate (reservoir 4) can be chosen. In addition, frictional heating of the journal-bearing interface provides a degree of self regulation. Embedded heaters are also possible and will provide higher thermal efficiency than the configuration shown.

Self-lubricating capability is inherent in the design of such a bearing. The porous matrix serves as the lubricant reservoir and is filled with the lubricant in solid form. Therefore, the lubricant surface exists at installation. By increasing the reservoir temperature slightly above the operating temperature (melting point of the metal impregnant) of the bearing unit, a new lubricant film is presented to the bearing-journal surface. As pointed out above, this heating may be supplied by frictional heating of the interface thus offering a degree of self regulation.

The operating temperature range of the bearing is extremely wide. Gallium-based alloys melt at near-room temperature, tin at 232° C., and gold at 1063° C. All three elements mentioned have a history of use as friction reducing agents. Tin and silver have been successfully infiltrated into tungsten. Furthermore, there are many matrices which will accept gallium alloys. It is, therefore, possible to cover fully any desirable operating temperature range within the present limits of the available materials technology through a judicious selection of metal impregnants and matrix elements.

Reservoir member 4 may be fabricated of any hard metal such as tungsten that is adaptable to bearing use. Furthermore, since the technology of powder metallurgy is well developed, a broad spectrum of alloys which are compatible with all suitable metal impregnants is available for the design of bearings over a broad range of operating temperatures.

The type of bearing lubrication provided by the devices of this invention is independent of gravitational field strength, inasmuch as the lubricant supply is effected by capillary action.

The lifetime of any bearing is largely determined by the rate of loss of lubricant and its lubrication efficiency when the supply rate is optimized. The rates of evaporation of dry film lubricants, such as $MoS_2$, are quite low. However, the binder matrix which retains the lubricant is usually adversely affected by heat. On the other hand, the rate of evaporation of a metal at projected operating temperatures is quite low and can be predicted exactly. For example, if the dimensions of a journal bearing are assumed to be 2 cm. in diameter with a clearance between the journal and bearing $10^{-2}$ cm., the loss of tin by evaporation would be ~0.76 gram/year at an operating temperature of 880° C. Reservoir members have been developed which hold ~0.9 gm. of lubricant/cc. of matrix. Gold would have an evaporation rate about a factor of 10 lower at the same temperature while both silver and gallium posses vapor pressures leading to rates an order of magnitude larger at this temperature. The following formulae and calculations indicate the manner in which the above parameters may be calculated.

The loss of the lubricant is dependent on the exposed area of the lubricating film and on the operating temperature through the relation $$W = 0.0583 A p M^{0.5} T^{-0.5} \text{ gram/sec.} \quad (1)$$

where $A$ = exposed area of lubricant, cm.$^2$
$p$ = vapor pressure of lubricant, microns
$M$ = atomic weight of lubricant
$T$ = operating temperature, ° K.

The vapor pressure of a metal in microns is related to the temperature by $$\log p = A - B/T$$

where $A$ and $B$ are constants for a specific metal. The values of $A$ and $B$ for some representative metals are presented in Table I below.

*Table I*

| Metal | A | $10^{-3}B$ |
|---|---|---|
| Tin | 10.88 | 14.87 |
| Silver | 11.85 | 14.27 |
| Gold | 11.89 | 17.58 |
| Gallium | 11.41 | 13.84 |
| Indium | 11.23 | 12.48 |

To determine the level of lubricant loss by evaporation assume a shaft 2 cm. in diameter with a radial clearance between that shaft and bearing of $10^{-2}$ cm. The exposed area would be $$A = 2\pi dt = 0.126 \text{ cm.}^2$$

Further assuming that the lubricant is tin, the losses at temperatures of 510° K. (a few degrees above the melting point of tin), and 1155° K. are as shown in the following Table II.

*Table II*

| Temp., ° K. | Lubricant Loss | |
|---|---|---|
| | Grams/sec | Grams/year |
| 510 | $6.1 \times 10^{-21}$ | $1.9 \times 10^{-15}$ |
| 1,155 | $2.4 \times 10^{-8}$ | 0.76 |

After the impregnated porous bearing has been installed as a journal bearing, it must be heated to drive the lubricant metal out of the porous matrix to form a useful film at the bearing surfaces.

The volume of the bearing (assumed to be in the form of an annulus) is:

$V_B = \pi l (r_1^2 - r_2^2)$
$l$ = bearing length
$r_1$ = bearing outer radius
$r_2$ = bearing inner radius The volume of the lubricant in the liquid state is the volume of pores in the porous matrix:

$$V_L = (1-d) c \pi l (r_1^2 - r_2^2) \quad (4)$$

$d$ = ratio to theoretical density of the porous matrix material
$c$ = ratio of interconnected pores to total number of pores The volume of lubricant required is the volume of fluid required to wet the inside of the bearing and the outside of the shaft to a thickness $t$ and is $$V_F = \pi 2 r_2 l 2 t = 4 \pi r_2 l t \quad (5)$$

The temperature rise $\Delta t$ required to increase the lubricant volume by $V_F$ may be calculated as follows:

$$\Delta V_L = V_F = \Delta T \alpha V_L \quad (6)$$

where $\Delta T$ = temperature rise
$\alpha$ = volume coefficient of expansion $$\Delta T = \frac{V_F}{\alpha V_L} \quad (7)$$

$$\Delta T = \frac{4 \pi r_2 l t}{\alpha (1-d) c \pi l (r_1^2 - r_2^2)} \quad (8)$$

$$T = \frac{4t}{(1-d) c (r_1^2 / r_2)} \quad (9)$$

For tin $\alpha = 54 \times 10^{-6}$ cm.$^3$/cm.$^3$ ° C.$^{-1}$ (9a)

Let
$d = 0.85$
$c = 0.93$
$r_1 = 1.19$ cm.
$r_2 = 0.24$ cm.
$t = 10^{-4}$ cm.

Hence $$T = \frac{4 \cdot 10^{-4}}{(54 \times 10^{-6}) 0.15 \times 0.93 [(1.19)^2 10.24]} = 9° \text{ C.}$$

in order that a quantity of lubricant equal to the volume of the bearing-journal interspace be supplied.

Cleanliness of operation is of great importance in practically any remote space application, and it is a cardinal point in an operation which must be maintenance-free for extended periods. The single component lubricant which is not abrasive with respect to the bearing surfaces comprehended by this invention is ideally suited in this respect. Furthermore, the metal film lubricant of the invention exhibits greater resistance to radiation damage than any dry film, oil, or grease-type lubricant and no severe environmental simulation problems are encountered in this area.

As indicated above, the principle of self-lubrication from a porous matrix of the type herein described is flexible and can be applied to roller or ball bearings as well as to face seal geometries.

By way of example, a bearing of the type illustrated in FIGURES 1 and 2 was fabricated having an inside diameter of 3/16", a length of 3/8" and an outside diameter of 1.5". The reservoir member 4 was machined from tin infiltrated porous tungsten. The shaft 7 was made of a 3/16" diameter 440 C steel. In fabricating the bearing, a 2" diameter x 1½" long, 85% dense, 93% interconnected porous tungsten bar, impregnated with pure tin, was employed. The impregnated tungsten bar was machined to the above recited reservoir dimensions. Pore closure pursuant to machining was minimized by machining nearly to size and then reversing the cutting direction so that the closed pores would be reopened. The outer surfaces of the infiltrated reservoir member were fitted with copper plates comprising cap member 5 which maintained contact pressure against the bearing. This contact pressure was necessary to constrain the molten tin to exit only from the bearing at the bearing/journal interface 9. The bearing thus fabricated was found to exhibit a coefficient of friction in the range of $0.19 > \mu > 0.17$ when operated in a vacuum of $5 \times 10^{-5}$ torr and in the temperature range of 246° C. to 250 °C.

Figure 3:
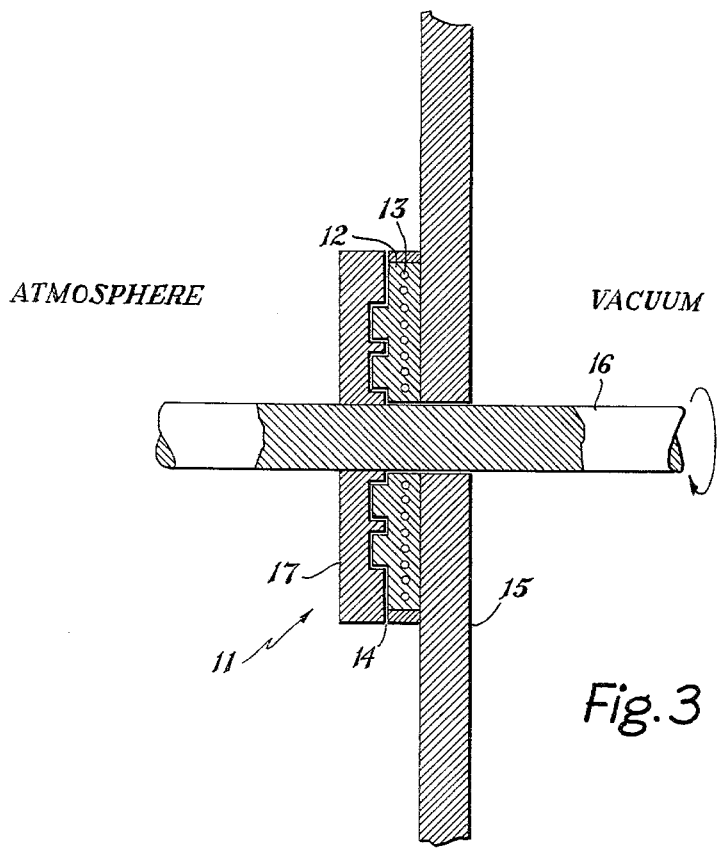
FIGURE 3 illustrates, in partial section, a rotating vacuum seal employing the principles of the invention.

Referring now to FIGURE 3, there is illustrated thereby a rotating vacuum face seal 11 that employs the principles of the invention. The purpose of such a rotating seal is to provide a rotating drive within a vacuum environment without adversely affecting the degree of vacuum. In the present illustration, wall 15 defines the vacuum environment and shaft 16 passing therethrough provides the rotating drive. A metal lubricant reservoir 12, which is fabricated of porous bearing material such as employed in bearing reservoir 4, is contiguously affixed to wall 15 as shown. A heater coil 13 is embedded therein. A solid metal member 17 is affixed to shaft 16 and adapted to mate with the outer surface of reservoir 12. The interface area 14 between reservoir 12 and member 17 is preferably designed to form a labyrinth wherein a film of liquid metal may be maintained. Such film of liquid metal is maintained therebetween by impregnating reservoir 12 with a metal such as gold or tin and maintaining a temperature by means of heater coil 13 adapted to melt said impregnated metal.

While it has been shown and described what is considered at present to be preferred embodiments of the invention, modifications thereto will readily occur to those skilled in the art. It is not therefore desired that the invention be limited to the specific arrangements shown and described, and it is intended to cover in the appended claim all such modifications that fall within the true spirit and scope of the invention.

What is claimed is:

A vacuum bearing comprising a porous metal member having at least one surface adapted to accept a journal, said porous metal member being impregnated with a metal having a lower melting point than its own, means for closing all surface pores therein except bearing-journal interface surface pores, a band of non-wettable material on said journal to prevent loss of liquid metal lubricant along the shaft, and means for heating said porous metal member above the melting point of said impregnated metal.

References Cited by the Examiner
UNITED STATES PATENTS 2,961,276  11/1960  Wade _____ 308—78

DON A. WAITE, *Primary Examiner.*

FRANK SUSKO, *Examiner.*